(12) United States Patent
Lensbouer

(10) Patent No.: US 9,828,486 B2
(45) Date of Patent: Nov. 28, 2017

(54) HALOGENATED POLYSACCHARIDES

(71) Applicant: Mannington Mills, Inc., Salem, NJ (US)

(72) Inventor: Joshua Lensbouer, Abingdon, MD (US)

(73) Assignee: Mannington Mills, Inc., Salem, NJ (US)

( * ) Notice: Subject to any disclaimer, the term of this patent is extended or adjusted under 35 U.S.C. 154(b) by 0 days.

(21) Appl. No.: 15/068,776

(22) Filed: Mar. 14, 2016

(65) Prior Publication Data

US 2016/0280804 A1    Sep. 29, 2016

Related U.S. Application Data

(60) Provisional application No. 62/137,840, filed on Mar. 25, 2015.

(51) Int. Cl.
| C08K 5/00  | (2006.01) |
| C08B 37/00 | (2006.01) |
| C08L 3/04  | (2006.01) |
| C08B 31/08 | (2006.01) |

(52) U.S. Cl.
CPC .............. *C08K 5/005* (2013.01); *C08B 31/08* (2013.01); *C08B 37/00* (2013.01); *C08K 5/0008* (2013.01); *C08K 5/0016* (2013.01); *C08L 3/04* (2013.01)

(58) Field of Classification Search
CPC .................................................. C08K 5/005
See application file for complete search history.

(56) References Cited

U.S. PATENT DOCUMENTS

| 4,172,169 | A |  | 10/1979 | Mawson et al. |
| 4,187,131 | A |  | 2/1980 | Shortway et al. |
| 4,313,866 | A |  | 2/1982 | Renshaw |
| 4,423,178 | A |  | 12/1983 | Renshaw |
| 4,614,680 | A |  | 9/1986 | Fry et al. |
| 4,813,533 | A |  | 3/1989 | Long |
| 5,112,671 | A |  | 5/1992 | Diamond et al. |
| 5,380,794 | A |  | 1/1995 | Schaefer et al. |
| 5,955,101 | A | * | 9/1999 | Ghent ................... A61K 33/18 424/451 |
| 8,658,274 | B2 |  | 2/2014 | Chen et al. |
| 2011/0226706 | A1 | * | 9/2011 | Theivendran ......... C02F 1/002 210/753 |
| 2011/0319503 | A1 | * | 12/2011 | Muller .................... A61J 3/077 514/778 |

OTHER PUBLICATIONS

Sato et al, An Improved Procedure for the Preparation of Chlorinated Cellulose with Methanesulfonyl Chloride in a Dimethylformamide-Chloral-Pyridine Mixture, 1990, journal of polymer science, vol. 28, issue 8, pp. 2223-2227.*
Dongre et al, Bromine pretreated chitosan for adsorption of lead (II) from water, 2012, bull. mater. sci., vol. 35, No. 5, pp. 875-884.*

* cited by examiner

*Primary Examiner* — Melvin C Mayes
*Assistant Examiner* — Stefanie Cohen
(74) *Attorney, Agent, or Firm* — Kilyk & Bowersox, P.L.L.C.

(57) ABSTRACT

A halogenated polysaccharide is provided having a halogen content of from about 1.0 wt. % to about 85 wt. % based on the total weight of the halogenated polysaccharide and having an average chain length of at least 6 monosaccharides. Methods of halogenating a polysaccharide to form a halogenated polysaccharide are provided that can be performed in the presence or absence of a proton solvent. Compositions such as articles of manufacture containing a halogenated polysaccharide and methods of producing such articles are also provided. The article of manufacture can also include one or more additional polymers, for example, polyvinylchloride (PVC). The article of manufacture can be, for example, a flooring tile, flooring plank, or carpet. Halogenated polysaccharides and products containing the same are bio-based, environmentally sustainable replacements or complements to existing polymers and polymer products.

46 Claims, No Drawings

HALOGENATED POLYSACCHARIDES

This application claims the benefit under 35 U.S.C. §119 (e) of prior U.S. Provisional Patent Application No. 62/137, 840, filed Mar. 25, 2015, which is incorporated in its entirety by reference herein.

BACKGROUND OF THE INVENTION

The present invention relates to halogenated polysaccharides, their synthesis, and their use in articles of manufacture.

Polyvinyl chloride (PVC) resins include chains of ethylene chloride that have been cross-linked to form a polymer with a specific molecular weight or chain size. PVC can be mixed with other polymers such as thermoplastic urethanes, acrylic resins, and acrylonitrile butadiene styrene (ABS) materials to affect the physical characteristics of an overall polymer alloy. PVC is commonly used in pipes, shower curtains, flooring, construction materials, and many other consumer applications.

The dwindling supply of natural resources, fluctuating prices of petroleum products, concerns about greenhouse gases, and demand from consumers for more environmentally sustainable materials has dramatically increased the desire to utilize bio-based material. However, challenges exist in the production of bio-based materials. Such challenges include starting material feed stocks, already developed markets for competing products, and an inclination by industry and customers to maintain the composition of existing products. Although bio-based PVC may be produced using renewable ethanol-to-ethylene as a feedstock, bio-based PVC is not commercially viable due to the low cost of petroleum and natural gas starting materials. However, petroleum products and natural gas can be volatile in price, their availability can be affected by geopolitical events, and they can require substantial infrastructure development. PVC derived from petroleum products and natural gas is not renewable or sustainable.

Accordingly, there is a need for bio-based PVC alternatives that can harness renewable feed stocks.

SUMMARY OF THE PRESENT INVENTION

A feature of the present invention is to provide a bio-based alternative or supplement to PVC useful in a wide variety of applications.

Another feature of the present invention is to provide a high yielding synthesis for halogenating polysaccharides by reacting polysaccharides in the presence of a halogenating agent and non-proton solvent, or by reacting polysaccharides in the presence of a proton solvent with a halogenating agent.

A further feature of the present invention is to provide a method for substituting PVC resin with halogenated polysaccharides An additional feature of the present invention is to provide a non-foodstuff, non-edible material for forming articles of manufacture such as types of flooring.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a halogenated polysaccharide having a halogen content of from about 1.0 wt. % to about 85 wt. % based on the total weight of the halogenated polysaccharide and having an average chain length of at least 6 monosaccharides.

The present invention also relates to method of halogenating a polysaccharide to form a halogenated polysaccharide. At least one polysaccharide in at least one proton solvent can be reacted with at least one halogen source in at least one non-reactive solvent to form a reaction mixture. The reaction mixture can be neutralized to form a neutralized composition containing the halogenated polysaccharide. The halogenated polysaccharide can be recovered.

The present invention further relates to a method of halogenating a polysaccharide to form a halogenated polysaccharide that does not require a proton solvent. At least one polysaccharide in at least one non-reactive solvent can be added to at least one halogen source solution to form a precipitate in a reaction mixture. The reaction mixture can be extracted with a second solvent to form an extracted organic layer. The halogenated polysaccharide can be recovered from the extracted organic layer.

The present invention also relates to an article of manufacture containing a halogenated polysaccharide. The article of manufacture can also include one or more additional polymers, for example, polyvinylchloride (PVC). The article of manufacture can also include at least one additive. The at least one additive can include, for example, a stabilizer, a plasticizer, a lubricant, a pigment, or any combination thereof. The article of manufacture can be any desired product having any desired form or style. The article of manufacture can be, for example, a flooring tile, flooring plank, or carpet.

It is to be understood that both the foregoing general description and the following detailed description are exemplary and explanatory only and intended to provide a further explanation of the present invention, as claimed.

DETAILED DESCRIPTION OF THE PRESENT INVENTION

The present invention relates to a halogenated polysaccharide having a halogen content of from about 1.0 wt. % to about 85 wt. % based on the total weight of the halogenated polysaccharide and having an average chain length of at least 6 monosaccharides. The halogenated polysaccharide can include a fluorinated polysaccharide, a chlorinated polysaccharide, a brominated polysaccharide, an iodinated polysaccharide, or any combination thereof. The halogenated polysaccharide can include at least one chlorinated polysaccharide. The halogenated polysaccharide can be halogenated with two or more different halogens. The halogenated polysaccharide can be chemically modified with at least one non-halogen moiety.

Polysaccharides can be selectively or non-selectively halogenated. One or more methods of halogenation can be employed. Halogenation can be electrophilic, nucleophilic, or both. Hydroxyl groups can be replaced with halogens with or without the use of protecting groups to control the location of halogenation. Halogenating agents and sources can be selected to control the location and degree of saturation. Polysaccharides can be saturated with halogens (e.g., per-halogenated) or only partially halogenated. Chirality can be preserved or altered during halogenation at one, two, three, four, or more chiral centers per monosaccharide. The halogenated polysaccharide can include an atactic polysaccharide, an isotactic polysaccharide, a syndiotactic polysaccharide, a heterotactic polysaccharide, an erythrodiisotactic polysaccharide, a threodisyndiotactic polysaccharide, or any combination thereof.

The halogenated polysaccharide can have any desired halogen content. For example, the halogenated polysaccharide can have a halogen content of from about 0.5 wt. % to about 95 wt. %, from about 1.0 wt. % to about 90 wt. %, from about 10 wt. % to about 85 wt. %, from about 20 wt. % to about 80 wt. %, from about 25 wt. % to about 50 wt. %, from about 30 wt. % to about 70 wt. %, from about 35 wt. % to about 65 wt. %, from about 40 wt. % to about 75 wt. %, from about 45 wt. % to about 70 wt. %, or from about 50 wt. % to about 60 wt. % based on the total weight of the halogenated polysaccharide. Polysaccharides may also be present in compositions of the halogenated polysaccharide that fall outside of a particular range. A weight percentage range of halogenation can be an average weight percentage.

The halogenated polysaccharide can have any desired molecular weight. The halogenated polysaccharide can have, for example, a molecular weight of from about 1.0 kD to about 100,000 kD, from about 5.0 kD to about 50,000 kD, from about 10 kD to about 10,000 kD, from about 50 kD to about 5,000 kD, or from about 100 kD to about 1,000 kD. Halogenated polysaccharides having molecular weights falling outside of a particular molecular weight range may also be present in a composition containing the halogenated polysaccharide of the present invention. A molecular weight range of a halogenated polysaccharide can be an average molecular weight range.

The halogenated polysaccharide can have any desired chain length. The halogenated polysaccharide can have, for example, an average chain length from about 100 monosaccharides to about 25,000 monosaccharides. The halogenated polysaccharide can have an average chain length of from about 3 monosaccharides to about 250,000 monosaccharides, from about 6 monosaccharides to about 100,000 monosaccharides, from about 10 monosaccharides to about 50,000 monosaccharides, from about 50 monosaccharides to about 10,000 monosaccharides, from about 100 monosaccharides to about 5,000 monosaccharides, or from about 500 monosaccharides to about 1,500 monosaccharides. The halogenated polysaccharide can have a chain length of 10, 25, 50, 100, 500, 1,000, 2,500, 5,000, 7,500, 10,000, 25,000, 50,000, 75,000, 100,000, 250,000, 500,000, 1,000,000, or more monosaccharides, an intervening range, or an average thereof. Halogenated polysaccharides can vary in their degree of linearity. For example, the halogenated polysaccharides can be branched or unbranched.

The halogenated polysaccharide is non-foodstuff or inedible. That is, the halogenated polysaccharides of the present invention are intended for use in non-food applications, for example, for use in building, construction, packaging, HVAC (heating, venting, and air conditioning), industrial uses, and materials, such as flooring products, boards, panels, sheets, films, decorative products, articles of various shapes, electrical/receptacle boxes, and plumbing and electrical conduits. Thus, there is a desire that the halogenated polysaccharides not be consumable by organisms known to prey on building infrastructure. The degree of halogenation can be adjusted to make the halogenated polysaccharide less susceptible to such consumption. The degree of halogenation can also be controlled such that the halogenated polysaccharide can still be biodegradable, but biodegradable under controlled parameters. For example, the halogenated polysaccharide can be engineered such that when articles of manufacture containing the halogenated polysaccharide reach the end of their useful life they can be disposed of in a manner that minimizes any negative impact on the environment.

The halogenated polysaccharide can include halogenated starch. For example, the halogenated starch can include halogenated amylose, halogenated amylopectin, halogenated dextran, halogenated glycogen, or any combination thereof. The halogenated starch can have a dextrose equivalent (DE) of from 0.0 to about 10. The polysaccharide can be a commercialized starch, for example, corn starch, tapioca, wheat, rice, potato starch, arrow root, or a combination thereof. The halogenated polysaccharide can include, for example, a halogenated maltodextrin (DE-20), a halogenated corn syrup (DE 30-70), a halogenated dextrose (D-100), a halogenated high fructose corn syrup, a halogenated sugar alcohol, or a combination thereof. The halogenated polysaccharide can include a halogenated modified starch, for example, an E coded starch (such as 1400-1452) or combination thereof.

The halogenated polysaccharide can include one or more plant structural polysaccharides that have been halogenated. The halogenated polysaccharide can include, for example, halogenated cellulose, halogenated hemicellulose, halogenated xylan, halogenated arabinoxylan, halogenated pectin, halogenated chitin, or any combination thereof. The halogenated polysaccharide can contain a combination of halogenated plant structural polysaccharides, for example, cellulose, and plant storage polysaccharide, for example, starch.

The halogenated polysaccharide can include a halogenated polymer of monosaccharides joined by an alpha-alpha linkage, a beta-beta linkage, an alpha-beta linkage, or any combination thereof. Monosaccharides can be joined by a 1-4 linkage, a 1-2 linkage, a 1-1 linkage, a 1-6 linkage, or any combination thereof. Monosaccharides of the halogenated polysaccharide can be cyclic, acyclic, or both. Monosaccharides of the halogenated polysaccharide can be in the form of furanose rings, pyranose rings, or any combination of anomers. Monosaccharides can include aldoses, ketoses, hemiacetals, or any combination thereof. The halogenated polysaccharide can include a halogenated polymer of hexose monosaccharides, pentose monosaccharides, or any combination thereof. The halogenated polysaccharide can include a halogenated polymer of ribose, arabinose, xylose, lyxose, allose, altrose, glucose, mannose, gulose, iodose, galactose, talose, fructose, or any combination thereof. The halogenated polysaccharide can include a halogenated copolymer. The halogenated copolymer can include two or more different kinds of monosaccharides. Different monosaccharides can differ with respect to differences in halogenation, may differ in structure independent of any halogenation, or both.

The halogenated polysaccharide or a combination of halogenated polysaccharides can be provided in any suitable form. For example, the halogenated polysaccharide or combination of halogenated polysaccharides can be provided in liquid form, solid form, or a combination thereof. The halogenated polysaccharide or combination of polysaccharides can be provided a solution, a suspension, a plastisol, a resin, a powder, or a gel. A composition can contain the halogenated polysaccharide or combination of halogenated polysaccharides in an amount of from about 0.5 wt. % to about 100 wt. %, from about 1.0 wt. % to about 95 wt. %, from about 5.0 wt. % to about 90 wt. %, from about 10 wt. % to about 85 wt. %, from about 25 wt. % to about 75 wt. %, from about 30 wt. % to about 60 wt. %, from about 35 wt. % to about 50 wt. %, from about 0.5 wt. % to about 50 wt. %, from about 50 wt. % to about 100 wt. %, or any other intervening or overlapping range thereof based on the total weight of the composition. Any suitable solvent or combination of solvents can be included in such a composition. The solvent can include a polar solvent, a nonpolar solvent or both. The solvent can be aqueous. The solvent can be organic. The solvent can contain an alcohol, an aldehyde, a ketone, an ether, an acid, or any combination thereof. A composition can be article of manufacture or a preparation for producing an article of manufacture.

Any halogenated polysaccharide or combination of halogenated polysaccharides can be included in or excluded from the compositions of the present invention. Any halogenated polysaccharide, halogenated oligosaccharide (for example, a chain of three to five saccharides), halogenated disaccharide, halogenated monosaccharide or any combination thereof can be included in or excluded from the compositions of the present invention. Polysaccharides, oligosaccharides, disaccharides, monosaccharides, or any combination thereof that are not halogenated can be present in or absent from a particular composition.

A method of halogenating a polysaccharide to form a halogenated polysaccharide is provided. At least one polysaccharide in at least one proton solvent can be reacted with at least one halogen source in at least one non-reactive solvent to form a reaction mixture. The reaction mixture can be neutralized to form a neutralized composition containing the halogenated polysaccharide. Neutralization can be performed using one or more suitable processes and reagents. For example, the pH of the reaction mixture can be neutralized to form a neutralized composition having a pH of from about 6.5 to about 7.5, from about 6.75 to about 7.25, from about 6.9, to about 7.1, or about 7.0. A basic reagent can be used to neutralize an acid reaction mixture and an acidic reagent can be used to neutralize a basic reaction mixture. An example of a suitable neutralizing agent is ammonia, such as methanolic ammonia, pyridine, or both. The halogenated polysaccharide can be recovered. Recovery can include, for example, one or more steps of concentration, washing, and/or drying. The neutralized reaction mixture can be concentrated to form a concentrated composition. The concentrated composition can be washed to form a washed composition. The washed composition can be dried to form a dried composition. The dried composition can be concentrated to form a powder containing the halogenated polysaccharide.

Reaction of the polysaccharide (in any of the processes of the present invention) with the halogenating source or agent (e.g., a chlorinating agent) can be performed at any suitable temperature, combination of temperatures, or range of temperatures, for example, at from about −20° C. to about 120° C., from about −10° C. to about 110° C., from about 0.0° C. to about 100° C., from about 5° C. to about 95° C., from about 10° C. to about 90° C., from about 15° C. to about 85° C., from about 25° C. to about 75° C., from about 40° C. to about 60° C., or any other intervening or overlapping temperature range. For example, the reaction mixture can be held at about 0° C., raised to ambient temperature, and then heated to about 100° C. Ambient temperature can be, for example, from about 20° C. to about 26° C., or about 23° C. The heating can be performed for from about 5.0 minutes to about 3 days, from about 15 minutes to about 1 day, from about 30 minutes to about 18 hours, from about 45 minutes to about 16 hours, from about 1.0 hour to about 12 hours, from about 1.5 hours to about 10 hours, from about 2.0 hours to about 8 hours, from about 4.0 hours to about 6.0 hours, or any other intervening or overlapping time period. For example, the heating can be performed from about 6 hours to about 12 hours. Individual heating stages can be performed for shorter or longer periods of time. Periods of cooling can be performed for similar periods and temperature ranges. Heating and cooling can be performed actively, passively, or both. Conduction, convection, radiation, or a combination thereof can be used for heating or cooling.

Any suitable halogen source or combination of halogen sources can be employed. The halogen source can be referred to as a halogen reagent or halogen agent. The halogen source can be, for example, a chlorine source. The chlorine source can be or contain one or more of thionyl chloride, phosgene, phosphorus trichloride, phosphorus oxychloride, and phosphorus pentachloride. A single source or multiple sources can be used for a particular halogen. Halogen sources can be used in any form or combination of forms—solid, liquid, and/or gaseous. Polysaccharides can be halogenated to form halogenated polysaccharides. Monosaccharides, disaccharides, and/or oligosaccharides can be first halogenated and then polymerized to form a halogenated polysaccharide.

Chlorination can be performed using any appropriate method or combination of methods. Any chlorination source or combination of chlorination sources can be employed. Chlorination can be performed using diatomic chlorine as a chlorine source. Chlorination can be performed electrochemically, for example, using hydrogen chloride as the chlorine source. Any appropriate chlorinating agent can be employed, for example, any chloride salt, any alkaline chloride salt, any alkaline earth chloride salt, PALAU'CHLOR, $Cl_2$, thionyl chloride, phosgene, phosphorus oxychloride, carbon tetrachloride, cyanuric chloride, N-chlorosuccinimide, phosphorous (V) oxychloride, phosphorous pentachloride, phosphorous trichloride, sulfuryl chloride, phenylselenenyl chloride, benzyltrimethylammonium tetrachloroiodate, tert-butyl hypochlorite, chloramine B hydrate, o-chloramine T dehydrate, chloramine T trihydrate, chloromethyl ethyl ether, N-chlorophthalimide, N-chlorosuccinimide, dichloramine T, dichloromethyl methyl ether, methanesulfonyl chloride, oxalyl chloride, sodium dichloroisocyanurate, trichloroisocyanuric acid, trichloromethanesulfonyl chloride, sulfonates of chloride, p-toluenesulfonylchloride (TsCl), methanesulfonylchloride (MsCl), or any combination thereof. One or more catalysts, for example, transition metals, can be used for chlorination. One or more enzymes can be used for chlorination.

Fluorination can be performed using any appropriate method or combination of methods. Any fluorination source or combination of fluorination sources can be employed. Fluorination can be performed using diatomic fluorine as a fluorine source. Fluorination can be performed electrochemically, for example, using hydrogen fluoride as the fluorine source. Any appropriate fluorinating agent or combination of fluorinating agents can be employed as the fluorine source, for example, any salt fluoride salt, any alkaline fluoride salt, any alkaline earth fluoride salt, xenon difluoride, cobalt(II) fluoride, cobalt(III) fluoride, diethylaminosulfur trifluoride (DAST), XTALFLUOR, XTALFLUOR-E, XTALFLUOR-M, SELECTFLUOR, DEOXOFLUOR, PHENOFLUOR, $SF_4$, $BrF_3$, $SbF_3$, $SbF_5$, hydrofluoric acid, potassium fluoride, potassium hydrogen fluoride, sodium fluoride, hydrogen fluoride, silver fluoride, $F_2$, NFSI, $FClO_3$, aminosulfurtrifluoride, cerium (IV) fluoride, $Bu_4NF$, pentafluoroiodoethane, 2,2-difluoro-1,3-dimethylimidazolidine, 1,3-dimethyl-2-imidazolidinone, N-fluoropyridinium, N-fluorocamphor sultam 7, bis(2-methoxyethyl)aminosulfur trifluoride, 2,2-difluoro-1,3-dimethylimidazolidine, pyridinium poly(hydrogenfluoride), tetrabutylammonium bifluoride, tetrabutylammonium difluorotriphenylsilicate, tetrabutylammonium difluorotriphenylstannate, tetrabutylammonium dihydrogen trifluoride, tetrabutylammonium fluoride, tetrabutylammonium trihydrofluoride, trimethylamine pentahydrofluoride, trimethylamine trihydrofluoride, 2,6-dichloro-1-fluoropyridinium trifluoromethanesulfonate, N-fluorobenzenesulfonimide, N-fluoro-N'-(chloromethyl)triethylenediamine his (tetrafluoroborate), 1-fluoro-2,6-dichloropyridinium tetrafluoroborate, 1-fluoropyridinium pyridine heptafluorodiborate, 1-fluoropyridinium tetrafluoroborate, 1-fluoropyridinium trifluoromethanesulfonate, 1-fluoro-2,4,6-trimethylpyridinium tetrafluoroborate, 1-fluoro-2,4,6-trimethylpyridinium trifluoromethanesulfonate, 4-iodotoluene difluoride (Tol-IF2), bis(trifluoromethane)sulfonimide, 4-tert-Butyl-2,6-dimethylphenylsulfur trifluoride, 1-chloromethyl-4-fluoro-1,4-diazoniabicyclo[2.2.2]octane bis(tetrafluoroborate), cyanuric fluoride, 2,6-dichloro-1-fluoropyridinium triflate, N,N-diethyl-1,1,2,3,3,3-hexafluoropropylamine, difluoromethyl phenyl sulfone, difluoromethyl phenyl sulfone, ethenesulfonyl fluoride, N-fluorobenzenesulfonimide, S-(α-fluorobenzyl)-S-phenyl-N-(p-tolylsulfonyl)sulfoximine, 2-fluoro-1,3-dimethylpyridinium p-toluenesulfonate, 1-fluoro-4-hydroxy-1,4-diazoniabicyclo[2,2,2]octane bis(tetrafluoroborate), 1-fluoropyridinium triflate, fluoro-N,N,N',N'-tetramethylformamidinium hexafluorophosphate, 1-fluoro-2,4,6-trimethylpyridinium triflate, hydrogen fluoride pyridine, poly[4-vinylpyridinium poly(hydrogen fluoride)], triethylamine trihydrofluoride, 2,2,2-trifluoroethyl trifluoromethanesulfonate, N,N-Diethyl(2-chloro-1,1,2-trifluoroethyl)-amine, or any combination thereof. One or more catalysts, for example, transition metals, can be used for fluorination. One or more enzymes can be used for fluorination.

Bromination can be performed using any appropriate method or combination of methods. Any bromination source or combination of bromination sources can be employed. Bromination can be performed using diatomic bromine as a bromine source. Bromination can be performed electrochemically, for example, using hydrogen bromide as the bromine source. Any appropriate brominating agent can be employed, for example, any bromide salt, any alkaline bromide salt, any alkaline earth bromide salt, $Br_2$, potassium tribromide, benzyltrimethylammonium tribromide, boron tribromide, N-bromoacetamide, 2-bromo-2-cyano-N,N-dimethylacetamide, bromodimethylsulfonium bromide, N-bromophthalimide, N-bromosaccharin, N-bromosuccinimide, bromotrichloromethane, 1-butyl-3-methylimidazolium tribromide, 1,8-diazabicyclo[5.4.0]-7-undecene hydrogen tribromide, 1,3-dibromo-5,5-dimethylhydantoin, dibromoisocyanuric acid, 5,5-dibromo-2,2-dimethyl-4,6-dioxy-1,3-dioxane, 1,2-dibromo-1,1,2,2-tetrachloroethane, 4-dimethylaminopyridinium bromide perbromide, monosodium bromoisocyanurate hydrate, 4,4'-methylenebis(cyclohexylamine), pyridinium bromide perbromide, 2,4,4,6-tetrabromo-2,5-cyclohexadienone, tetrabutylammonium tribromide, trimethylphenylammonium tribromide, triphenylphosphine dibromide, or any combination thereof. One or more catalysts, for example, transition metals, can be used for bromination. One or more enzymes can be used for bromination.

Iodination can be performed using any appropriate method or combination of methods. Any iodination source or combination of iodination sources can be employed. Iodination can be performed using diatomic iodine as an iodine source. Iodination can be performed electrochemically, for example, using hydrogen iodide as the iodine source. Any appropriate iodinating agent can be employed, for example, any iodide salt, any alkaline iodide salt, any alkaline earth iodide salt, $I_2$, benzyltrimethylammonium dichloroiodate, bis(pyridine)iodonium tetrafluoroborate, 1-chloro-2-iodoethane, 1,3-diiodo-5,5-dimethylhydantoin (DIH), hydriodic acid, N-iodosaccharin, N-iodosuccinimide, tetramethylammonium dichloroiodate, pyridinium iodochloride, diiodosilane, or any combination thereof. One or more catalysts, for example, transition metals, can be used for iodination. One or more enzymes can be used iodination.

The halogen polysaccharide can be halogenated to any desired amount or percentage. The halogenated polysaccharide can be halogenated, for example, with a substitution of halogen groups for hydroxyl groups of from about 0.1 molar equivalents to about 25 molar equivalents, from about 0.5 molar equivalents to about 15 molar equivalents, from about 1.0 molar equivalents to about 12.5 molar equivalents, from about 2.5 molar equivalents to about 10 molar equivalents, from about 3.5 molar equivalents to about 7.5 molar equivalents, or from about 4.5 molar equivalents to about 6.0 molar equivalents. For example, the substitution of halogen groups for hydroxyl groups can be from about 0.5 molar equivalents to about 8.0 molar equivalents. Any other intervening or overlapping range of halogenation can be used. The polysaccharide can be halogenated with a substitution of halogen groups for hydroxyl groups of greater than about 2.75, greater than about 3.0 molar equivalents, greater than about 3.5 molar equivalents, greater than about 4.0 molar equivalents, or greater than about 5.0 molar equivalents. The amount of halogenation can exceed that in existing halogenated polysaccharides, oligosaccharides, disaccharides, and/or monosaccharides. For example, the degree of halogenation can exceed that found in artificial sweeteners such as sucralose. Any halogen or combination of halogens can be present in the halogenated polysaccharide, any halogen or combination of halogens can be excluded from the halogenated polysaccharide.

Any appropriate proton solvent can be employed in a process for halogenating a polysaccharide in accordance with the methods of the present invention. The proton solvent can be or include pyridine, dimethylaminopyridine (DMAP), 4-(1-pyrrolidinyl) pyridine, or any combination thereof. Any appropriate non-reactive solvent can be used. The polysaccharide to pyridine ratio can be, for example, from about 0.25 to about 5.0 mole equivalents, from about 0.5 to about 3.5 mole equivalents, from about 0.6 to about 2.0 mole equivalents, from about 0.75 to about 1.4 mole equivalents, or any intervening or overlapping range thereof. The non-reactive solvent can include, for example, dichloroethane, trichloroethane, tetrachloroethane, N,N-dimethyl formamide (DMF), dimethyl sulfoxide, hexamethyl phosphoramide, or any combination thereof. A "non-reactive" solvent can have zero or a low degree of reactivity, but have no significant reactivity with respect to the halogenation reaction. Any suitable combination of proton solvent, halogen source, and non-reactive solvent can be employed. For example, the proton solvent can contain pyridine, the halogen source can contain a chlorine source, and the non-reactive solvent can contain 1,1,2-trichloroethane.

The method can include forming a pre-gel, for example, a pre-gel containing from about 0.25 wt. % to about 75 wt. %, from about 0.5 wt. % to about 50 wt. %, from about 1.0 wt. % to about 40 wt. %, from about 2.0 wt. % to about 20 wt. %, or from about 5.0 wt. % to about 15 wt. % of at least one halogenated polysaccharide based on the total weight of the pre-gel. Gelling to form a pre-gel of the halogenated polysaccharide can be performed using any suitable method, and may be performed analogously to the production of a PVC pre-gel from a plastisol, for example, as described in U.S. Pat. No. 4,813,533, incorporated in its entirety by reference herein. Gelling can result in the formation of a solid or semi-solid that does not flow at ambient temperature.

A method of halogenating a polysaccharide to form a halogenated polysaccharide is provided that can be performed without use of a proton solvent. At least one polysaccharide in at least one non-reactive solvent (as described earlier) can be added to at least one halogen source solution (as described earlier) to form a precipitate in a reaction mixture. The reaction mixture can be extracted with a second solvent (for instance, examples provided earlier) to form an extracted organic layer. The halogenated polysaccharide can be recovered from the extracted organic layer, for instance using one of the techniques described earlier or any conventional separation technique.

Any suitable heating and/or cooling conditions such as temperature and duration can be employed for the method. For example, the non-reactive solvent can be about 0° C. when added to the halogen source solution, the reaction mixture can be first heated to about 100° C., then can be heated again to about 115° C., and the extraction can be performed at ambient temperature. The heating at about 100° C. can be performed for from about 1 hour to about 3 hours, and the heating at about 115° C. can be performed for from about 1 hour to about 3 hours. The extraction can be performed any desired number of times using any suitable solvent or combination of solvents. For example, the extraction can be performed at least once using ethylacetate. Other extraction solvents that can be used include, for example, dichloromethane, chloroform, hexane, ether, or any combination thereof.

An article of manufacture containing at least one halogenated polysaccharide is provided. A method of forming an article of manufacture containing at least one halogenated polysaccharide is also provided, for example, by molding or extrusion. The article of manufacture can contain the at least one halogenated polysaccharide as the only polymer or type of polymer. Alternatively, the article of manufacture can contain the at least one halogenated polysaccharide in combination with one or more additional polymers. An article of manufacture can contain a polymer other than the halogenated polysaccharide or combination of halogenated polysaccharides in an amount of from about 0.1 wt. % to about 99 wt. %, from about 1.0 wt. % to about 95 wt. %, from about 5.0 wt. % to about 90 wt. %, from about 10 wt. % to about 85 wt. %, from about 25 wt. % to about 75 wt. %, from about 30 wt. % to about 60 wt. %, from about 35 wt. % to about 50 wt. %, from about 0.5 wt. % to about 50 wt. %, from about 50 wt. % to about 100 wt. %, or any other intervening or overlapping range thereof based on the total weight of the article of manufacture. In addition to the at least one halogenated polysaccharide, the article of manufacture can include one, two, three, four, five, six, ten, or more additional types of polymers that are not halogenated polysaccharides and/or are not polysaccharides.

The article of manufacture can contain at least one halogenated polysaccharide in combination with at least one additional polymer, for example, polyvinylchloride (PVC), thermoplastic urethanes, acrylic resins, acrylonitrile butadiene styrene (ABS), low density polyethylene (LDPE), high density polyethylene (HDPE), polypropylene, polystyrene, polytetrafluoroethylene, polychlorotrifluoroethylene, polyethylene terephthalate, polychloroprene, polyamide, polyaniline, polyarylate, polyacrylonitrile, polyaramid, polyimide, polycarbonate, polyester, polyethylene, polyethylene glycol (PEG), polyethylene oxide, polyglycol, polyisobutylene, polybutadiene, polybutene, polycarbosilane polymethylmethacrylate, polyacrylate, polyvinyl acetate, polyisoprene, polysilane, polysiloxane, or any combination thereof. Polymers used in combination with the halogenated polysaccharide can be halogenated, non-halogenated, or both. Any polymer can be included in or excluded from an article of manufacture containing at least one halogenated polysaccharide.

The halogenated polysaccharide can be used to replace from about 0.5 wt. % to about 100 wt. %, from about 0.1 wt. % to about 99 wt. %, from about 1.0 wt. % to about 95 wt. %, from about 5.0 wt. % to about 90 wt. %, from about 10 wt. % to about 85 wt. %, from about 25 wt. % to about 75 wt. %, from about 30 wt. % to about 60 wt. %, from about 35 wt. % to about 50 wt. %, from about 0.5 wt. % to about 50 wt. %, from about 50 wt. % to about 100 wt. %, or any other intervening or overlapping range thereof of PVC resin and/or other polymer in flooring and other article of manufacture based on their total weight. For example, an article of manufacture can contain from about 0.5 wt. % to about 100 wt. % of the halogenated polysaccharide and from about 0.5 wt. % to about 95.5 wt. % polyvinylchloride (PVC) based on the total weight of the article of manufacture. The resulting article of manufacture can have similar or superior properties than that of a corresponding product that is solely PVC-based. Any suitable method of producing articles of manufacture can be employed, for example, those described in U.S. Pat. No. 8,658,274, incorporated in its entirety by reference herein.

The article of manufacture can also include at least one additive. The at least one additive can include, for example, a stabilizer, a plasticizer, a lubricant, a pigment, or any combination thereof. Examples of stabilizers include ultraviolet (UV) stabilizers (such as carbon black, benzophenones, oxanilides, benzotriazoles, and hydroxyphenytriazines), hindered amine light stabilizers (HALS), thermal stabilizers, antioxidants, or any combination thereof. Examples of plasticizers include esters of sebacates, adipates, terephthalates, dibenzoates, gluterates, phthalates, azelates, or any combination thereof. Examples of phthalates include diisononyl phthalate (DINP), diisodecyl phthalate (DIDP), di-2-ethylhexyl phthalate (DEHP, DOP), or any combination thereof. Examples of lubricants include oils, greases, silicones, or any combination thereof In any article or product containing the halogenated polysaccharide(s) of the present invention, one or more fillers and/or colorants (e.g., pigments and/or dyes) can be present in the material or formulation used to form the article or product.

The filler can be, for example, a particulate material, which is dispersible in the material. The filler can be, for example, an inorganic filler, an organic filler, or any combinations of fillers. The material can form, for example, a continuous phase into which the filler is dispersed as a discrete phase.

The amount of filler in the formulation or material is not categorically limited, and can range, for example, from about 0.1 wt % to about 99 wt %, or from about 1 wt % to about 90 wt %, or from about 5 wt % to about 80 wt %, or from about 10 wt % to about 75 wt %, or from about 20 wt % to about 50 wt %, or other amounts, based on the total weight of the formulation or material.

The filler can be virgin filler and/or filler obtained from recycled material (e.g., filler used previously, parts of flooring, and the like). The virgin fillers can be any conventional virgin filler material, inclusive of those types traditionally used in surface coverings. The virgin fillers can be materials that are chemically inert with respect to other components of the formulation or material. An inorganic virgin filler can provide dimensional stability and/or reduced elasticity to a resilient compositional tile, and may provide properties of fire resistance.

The filler can be organic, inorganic, or a combination of both, such as with different morphologies.

The fillers can be, for example, calcium carbonate (natural, synthetically precipitated, or both), titanium dioxide, calcium oxide, perlite, barium sulfate, barite, alumina trihydrate, bauxite, magnesium hydroxide, silica, fumed silica, precipitated silica, fumed silica, silicates, glass, sand, kaolin, bentonite, glass powder, aluminum oxide or hydrated forms of it, coal, graphite, carbon black, coal fly ash, methal oxide(s), natural material, bauxite, talc, mica, barite, post-consumer glass, post-industrial glass, fiber (e.g., synthetic and/or natural), wood flour, metal carbonates, clay, wollastonite, gypsum, and/or any combinations thereof.

The filler can be or include post industrial recycled and/or post consumer recycled materials such as gypsum, wood, carpet or parts thereof, PVC, VCT recycled, and the like.

The particle size of the filler may vary depending on the material, and can be, for example, in the range of from about 1 to about 500 µm, or other sizes above and below these ranges.

The filler can be in any physical form that allows it to be mixed or blended with the other components to form the formulation or material. Typically, the filler is in the form of particles.

Renewable biomaterial, recycled inorganic waste material, or both, can be used or included. These materials can provide green content without sacrificing processability of the formulation and performance. Recycled post-industrial inorganic waste material which can be used include, for example, fly ash, lime stone, glass beads, and any combinations thereof. As indicated, fly ash is an inorganic combustion waste particulate. Various renewable biomaterials can be used. These can include plant materials such as agricultural crop materials and residues, virgin wood, waste wood, energy crops, and the like, and also other biomaterials such as food waste, industrial bio co-products, and any combinations thereof. The renewable biomaterial can be, for example, soy powder, starch powder, lignocellulosic biomass, vegetable oils, proteins and its derivatives, and any combinations thereof. Soy flour, for example, can be used as the renewable biomaterial. Soy Flour is a remaining co-product after oil is extracted from soybeans. The recycled material used can be recycled flooring or parts thereof (e.g., recycled VCT tiles, LVT flooring, laminate particle boards, carpet, carpet tiles, or parts or layers thereof).

Besides the components or materials mentioned already, other optional components that can be present or used in the formulations or materials of the present invention include, but are not limited to, one or more wetting agents, moisture scavengers, antimicrobials, biocides, pigments or colorants, viscosity depressant, surfactant, modifying resins, antioxidants, foaming agents, tackifiers, UV-stabilizers, antistatic agents, thermal and light stabilizers, flame retardants, and/or any other conventional organic or inorganic additives which may be commonly used in thermoplastic materials, such as, but not limited to, PVC conduits, boards, planks, flooring material, surface backings, surface coverings, and the like. These additives and how they are incorporated into different compositions or layers of surface coverings are described in U.S. Pat. Nos. 5,112,671; 4,614,680; 4,187,131; 4,172,169, 4,423,178; 4,313,866; and 5,380,794 incorporated by reference in their entireties herein.

The article of manufacture can be or include any desired product having any desired form or style. For example, the article of manufacture can be or include one or more of a fiber, a board, a tile, a sheet, a mesh, a fabric, a film, a brick, a shingle, a container, a rod, a beam, a sheath, or a pipe. The article of manufacture can be, for example, a flooring tile, flooring plank, or carpet. The article of manufacture can have a laminate or composite construction.

The articles of manufacture of the present invention can be characterized by various physical parameters, for example, modulus of elasticity, bending strength, internal bond strength, compressive strength, and tensile strength. An article of manufacture containing a halogenated polysaccharide of the present invention can have physical characteristics that approximate or that are superior to comparable article of manufacture containing primarily PVC or other standard non-polysaccharide polymers. Articles of manufacture containing halogenated polysaccharides according to the present invention can have characteristics that are surprising and unexpected. For example, they can be stronger, longer lasting, more versatile, more biodegradable, more sustainable, less burdensome on the environment, or any combination thereof.

The present invention will be further clarified by the following examples, which are intended to be exemplary of the present invention.

EXAMPLES

Example 1

A mixture of corn starch (10 g) and pyridine (19 ml, approximately 8 milliequivalents) was treated with thionyl chloride (15 ml, 7 milliequivalents) in 1,1,2-trichloroethane (4 ml) at 0° C. The reaction was brought to ambient temperature and then heated at 105° C. for 8 hours. The solution was neutralized with methanolic ammonia. The solution was concentrated, taken up in ether, washed with water, dried ($Na_2SO_4$), and concentrated to give a powder (13 g).

Example 2

25 g of corn starch and DMF (250 mL) were cooled down to 0° C. on ice, and then added over 1 h to thionyl chloride (66.5 mL). During the addition, a precipitate was formed. After that, the solution was heated to 100° C. over a period of 2 hours, and then heated to 115° C. for another 2 hours. The reaction was allowed to cool. Afterward, ethyl acetate was added and the organic layer was separated. A second extraction with ethyl acetate was conducted on the aqueous layer. The combined organic layer was washed with water. The organic layer was removed leaving the crude chlorinated polysaccharide (28 g).

Example 3

A pre-gel was made in the lab using 5% chlorinated saccharide in substitution of PVC resin using a suitable pre-gel formulation and standard lab production procedure for a heterogeneous vinyl sheet sample production.

The present invention includes the following aspects/embodiments/features in any order and/or in any combination:

1. The present invention relates to a halogenated polysaccharide having a halogen content of from about 1.0 wt. % to about 85 wt. % based on the total weight of the halogenated polysaccharide and having an average chain length of at least 6 monosaccharides.

2. The halogenated polysaccharide of any preceding or following embodiment/feature/aspect, wherein the halogenated polysaccharide comprises a fluorinated polysaccharide, a chlorinated polysaccharide, a brominated polysaccharide, an iodinated polysaccharide, or any combination thereof.

3. The halogenated polysaccharide of any preceding or following embodiment/feature/aspect, wherein the halogenated polysaccharide comprises at least one chlorinated polysaccharide.

4. The halogenated polysaccharide of any preceding or following embodiment/feature/aspect, having a halogen content of from about 40 wt. % to about 75 wt. % based on the total weight of the halogenated polysaccharide.

5. The halogenated polysaccharide of any preceding or following embodiment/feature/aspect having a molecular weight of from about 1.0 kD to about 10,000 kD.

6. The halogenated polysaccharide of any preceding or following embodiment/feature/aspect, wherein the average chain length is from about 100 monosaccharides to about 25,000 monosaccharides.

7. The halogenated polysaccharide of any preceding or following embodiment/feature/aspect, wherein the halogenated polysaccharide is non-foodstuff or inedible.

8. The halogenated polysaccharide of any preceding or following embodiment/feature/aspect, wherein the halogenated polysaccharide comprises halogenated starch.

9. The halogenated polysaccharide of any preceding or following embodiment/feature/aspect, wherein the halogenated starch comprises halogenated amylose, halogenated amylopectin, or any combination thereof.

10. The halogenated polysaccharide of any preceding or following embodiment/feature/aspect, wherein the halogenated starch has a dextrose equivalent (DE) of from 0.0 to about 10.

11. The halogenated polysaccharide of any preceding or following embodiment/feature/aspect, wherein the halogenated polysaccharide comprises halogenated amylose, halogenated amylopectin, halogenated dextran, halogenated glycogen, or any combination thereof.

12. The halogenated polysaccharide of any preceding or following embodiment/feature/aspect, wherein the halogenated polysaccharide comprises halogenated cellulose, halogenated hemicellulose, halogenated xylan, halogenated arabinoxylan, halogenated pectin, halogenated chitin, or any combination thereof.

13. The halogenated polysaccharide of any preceding or following embodiment/feature/aspect, wherein the halogenated polysaccharide comprises an atactic polysaccharide, an isotactic polysaccharide, a syndiotactic polysaccharide, a heterotactic polysaccharide, an erythrodiisotactic polysaccharide, a threodisyndiotactic polysaccharide, or any combination thereof.

14. The halogenated polysaccharide of any preceding or following embodiment/feature/aspect, wherein the halogenated polysaccharide comprises a halogenated polymer of monosaccharides joined by an alpha-alpha linkage, a beta-beta linkage, an alpha-beta linkage, or any combination thereof.

15. The halogenated polysaccharide of any preceding or following embodiment/feature/aspect, wherein the halogenated polysaccharide comprises a halogenated polymer of hexose monosaccharides, pentose monosaccharides, or any combination thereof.

16. The halogenated polysaccharide of any preceding or following embodiment/feature/aspect, wherein the halogenated polysaccharide comprises a halogenated polymer of ribose, arabinose, xylose, lyxose, allose, altrose, glucose, mannose, gulose, iodose, galactose, talose, fructose, or any combination thereof.

17. The halogenated polysaccharide of any preceding or following embodiment/feature/aspect, wherein the halogenated polysaccharide comprises a halogenated copolymer.

18. The halogenated polysaccharide of any preceding or following embodiment/feature/aspect, wherein the polysaccharide is halogenated with two or more different halogens.

19. The halogenated polysaccharide of any preceding or following embodiment/feature/aspect, wherein the halogenated polysaccharide is chemically modified with at least one non-halogen moiety.

20. The halogenated polysaccharide of any preceding or following embodiment/feature/aspect in the form of a resin, powder, or gel.

21. A method of halogenating a polysaccharide to form the halogenated polysaccharide of any preceding or following embodiment/feature/aspect comprising:
    reacting at least one polysaccharide in at least one proton solvent with at least one halogen source in at least one non-reactive solvent to form a reaction mixture;
    neutralizing the reaction mixture to form a neutralized composition comprising the halogenated polysaccharide; and
    recovering the halogenated polysaccharide.

22. The method of any preceding or following embodiment/feature/aspect, further comprising:
    concentrating the neutralized reaction mixture to form a concentrated composition;
    washing the concentrated composition to form a washed composition;
    drying the washed composition to form a dried composition; and
    concentrating the dried composition to form a powder comprising the halogenated polysaccharide.

23. The method of any preceding or following embodiment/feature/aspect, wherein the reaction mixture is held at about 0° C., raised to ambient temperature, and heated to about 100° C.

24. The method of claim any preceding or following embodiment/feature/aspect, wherein the heating is performed for from about 6 hours to about 12 hours.

25. The method of any preceding or following embodiment/feature/aspect, wherein the halogen source comprises thionyl chloride, phosgene, phosphorus trichloride, phosphorus oxychloride, or phosphorus pentachloride.

26. The method of any preceding or following embodiment/feature/aspect, wherein the halogen source comprises thionyl chloride.

27. The method of any preceding or following embodiment/feature/aspect, wherein the polysaccharide is halogenated with a substitution of halogen groups for hydroxyl groups of from about 0.5 molar equivalents to about 8.0 molar equivalents.

28. The method of any preceding or following embodiment/feature/aspect, wherein the polysaccharide is halogenated with a substitution of halogen groups for hydroxyl groups of greater than about 3.0 molar equivalents.

29. The method of any preceding or following embodiment/feature/aspect, wherein the proton solvent comprises pyridine, dimethylaminopyridine (DMAP), 4-(1-pyrrolidinyl) pyridine, or any combination thereof.

30. The method of any preceding or following embodiment/feature/aspect, wherein the non-reactive solvent comprises dichloroethane, trichloroethane, tetrachloroethane, N,N-dimethyl formamide (DMF), dimethyl sulfoxide, hexamethyl phosphoramide, or any combination thereof.

31. The method of any preceding or following embodiment/feature/aspect, wherein the proton solvent comprises pyridine, the halogen source is a chlorine source, and the non-reactive solvent comprises 1,1,2-trichloroethane.

32. The method of any preceding or following embodiment/feature/aspect, further comprising forming a pre-gel comprising from about 2 wt. % to about 20 wt. % of the halogenated polysaccharide based on the total weight of the pre-gel.

33. A method of halogenating a polysaccharide to form the halogenated polysaccharide of any preceding or following embodiment/feature/aspect comprising:
   adding at least one polysaccharide in at least one non-reactive solvent to at least one halogen source solution to form a precipitate in a reaction mixture;
   extracting the reaction mixture with a second solvent to form an extracted organic layer; and
   recovering the halogenated polysaccharide from the extracted organic layer.

34. The method of any preceding or following embodiment/feature/aspect, wherein the non-reactive solvent is about 0° C. when added to the halogen source solution, the reaction mixture is first heated to about 100° C., and then heated again to about 115° C., and the extraction is performed at ambient temperature.

35. The method of any preceding or following embodiment/feature/aspect, wherein the heating at about 100° C. is for from about 1 hour to about 3 hours, and the heating at about 115° C. is for from about 1 hour to about 3 hours.

36. The method of any preceding or following embodiment/feature/aspect, wherein the non-reactive solvent comprises dichloroethane, trichloroethane, tetrachloroethane, N,N-dimethyl formamide (DMF), dimethyl sulfoxide, hexamethyl phosphoramide, or any combination thereof.

37. The method of any preceding or following embodiment/feature/aspect, wherein the extraction is performed at least once using ethylacetate.

38. The method of any preceding or following embodiment/feature/aspect, wherein the halogen source solution comprises thionyl chloride, phosgene, phosphorus trichloride, phosphorus oxychloride, or phosphorus pentachloride.

39. The method of any preceding or following embodiment/feature/aspect, wherein the polysaccharide is halogenated with a substitution of halogen groups for hydroxyl groups of from about 0.5 molar equivalents to about 8.0 molar equivalents.

40. The method of any preceding or following embodiment/feature/aspect, wherein the polysaccharide is halogenated with a substitution of halogen groups for hydroxyl groups of greater than about 3.0 molar equivalents.

41. The method of any preceding or following embodiment/feature/aspect, further comprising forming a pre-gel comprising from about 2 wt. % to about 20 wt. % of the halogenated polysaccharide based on the total weight of the pre-gel.

42. An article of manufacture comprising the halogenated polysaccharide of any preceding or following embodiment/feature/aspect.

43. The article of manufacture of any preceding or following embodiment/feature/aspect, further comprising polyvinylchloride (PVC).

44. The article of manufacture of any preceding or following embodiment/feature/aspect, further comprising at least one additive.

45. The article of manufacture of any preceding or following embodiment/feature/aspect, wherein the at least one additive comprises a stabilizer, a plasticizer, a lubricant, a pigment, or any combination thereof.

46. The article of manufacture of any preceding or following embodiment/feature/aspect, wherein the article of manufacture is a fiber, a board, a tile, a sheet, a mesh, a fabric, a film, a brick, a shingle, a container, a rod, a beam, a sheath, or a pipe.

47. A flooring tile, flooring plank, or carpet comprising the halogenated polysaccharide of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A flooring tile, flooring plank, or carpet comprising a halogenated polysaccharide having a halogen content of from about 1.0 wt. % to about 85 wt. % based on the total weight of the halogenated polysaccharide and having an average chain length of at least 6 monosaccharides.

2. The flooring tile, flooring plank, or carpet of claim 1, wherein the halogenated polysaccharide comprises a fluorinated polysaccharide, a chlorinated polysaccharide, a brominated polysaccharide, an iodinated polysaccharide, or any combination thereof.

3. The flooring tile, flooring plank, or carpet of claim 1, wherein the halogenated polysaccharide comprises at least one chlorinated polysaccharide.

4. The flooring tile, flooring plank, or carpet of claim 1, having a halogen content of from about 40 wt. % to about 75 wt. % based on the total weight of the halogenated polysaccharide.

5. The flooring tile, flooring plank, or carpet of claim 1 having a molecular weight of from about 1.0 kD to about 10,000 kD.

6. The flooring tile, flooring plank, or carpet of claim 1, wherein the average chain length is from about 100 monosaccharides to about 25,000 monosaccharides.

7. The flooring tile, flooring plank, or carpet of claim 1, wherein the halogenated polysaccharide is non-foodstuff or inedible.

8. The flooring tile, flooring plank, or carpet of claim 1, wherein the halogenated polysaccharide comprises halogenated starch.

9. The flooring tile, flooring plank, or carpet of claim 8, wherein the halogenated starch comprises halogenated amylose, halogenated amylopectin, or any combination thereof.

10. The flooring tile, flooring plank, or carpet of claim 8, wherein the halogenated starch has a dextrose equivalent (DE) of from 0.0 to about 10.

11. The flooring tile, flooring plank, or carpet of claim 1, wherein the halogenated polysaccharide comprises halogenated amylose, halogenated amylopectin, halogenated dextran, halogenated glycogen, or any combination thereof.

12. The flooring tile, flooring plank, or carpet of claim 1, wherein the halogenated polysaccharide comprises halogenated cellulose, halogenated hemicellulose, halogenated xylan, halogenated arabinoxylan, halogenated pectin, halogenated chitin, or any combination thereof.

13. The flooring tile, flooring plank, or carpet of claim 1, wherein the halogenated polysaccharide comprises an atactic polysaccharide, an isotactic polysaccharide, a syndiotactic polysaccharide, a heterotactic polysaccharide, an erythrodiisotactic polysaccharide, a threodisyndiotactic polysaccharide, or any combination thereof.

14. The flooring tile, flooring plank, or carpet of claim 1, wherein the halogenated polysaccharide comprises a halogenated polymer of monosaccharides joined by an alpha-alpha linkage, a beta-beta linkage, an alpha-beta linkage, or any combination thereof.

15. The flooring tile, flooring plank, or carpet of claim 1, wherein the halogenated polysaccharide comprises a halogenated polymer of hexose monosaccharides, pentose monosaccharides, or any combination thereof.

16. The flooring tile, flooring plank, or carpet of claim 1, wherein the halogenated polysaccharide comprises a halogenated polymer of ribose, arabinose, xylose, lyxose, allose, altrose, glucose, mannose, gulose, iodose, galactose, talose, fructose, or any combination thereof.

17. The flooring tile, flooring plank, or carpet of claim 1, wherein the halogenated polysaccharide comprises a halogenated copolymer.

18. The flooring tile, flooring plank, or carpet of claim 1, wherein the polysaccharide is halogenated with two or more different halogens.

19. The flooring tile, flooring plank, or carpet of claim 1, wherein the halogenated polysaccharide is chemically modified with at least one non-halogen moiety.

20. The flooring tile, flooring plank, or carpet of claim 1, wherein the halogenated polysaccharide is in the form of a resin, powder, or gel.

21. A method of halogenating a polysaccharide to form a halogenated polysaccharide having a halogen content of from about 1.0 wt. % to about 85 wt. % based on the total weight of the halogenated polysaccharide and having an average chain length of at least 6 monosaccharides, said method comprising:
reacting at least one polysaccharide in at least one proton solvent with at least one halogen source in at least one non-reactive solvent to form a reaction mixture;
neutralizing the reaction mixture to form a neutralized composition comprising the halogenated polysaccharide; and
recovering the halogenated polysaccharide.

22. The method of claim 21, further comprising:
concentrating the neutralized reaction mixture to form a concentrated composition;
washing the concentrated composition to form a washed composition;
drying the washed composition to form a dried composition; and
concentrating the dried composition to form a powder comprising the halogenated polysaccharide.

23. The method of claim 21, wherein the reaction mixture is held at about 0° C., raised to ambient temperature, and heated to about 100° C.

24. The method of claim 23, wherein the heating is performed for from about 6 hours to about 12 hours.

25. The method of claim 21, wherein the halogen source comprises thionyl chloride, phosgene, phosphorus trichloride, phosphorus oxychloride, or phosphorus pentachloride.

26. The method of claim 21, wherein the halogen source comprises thionyl chloride.

27. The method of claim 21, wherein the polysaccharide is halogenated with a substitution of halogen groups for hydroxyl groups of from about 0.5 molar equivalents to about 8.0 molar equivalents.

28. The method of claim 21, wherein the polysaccharide is halogenated with a substitution of halogen groups for hydroxyl groups of greater than about 3.0 molar equivalents.

29. The method of claim 21, wherein the proton solvent comprises pyridine, dimethylaminopyridine (DMAP), 4-(1-pyrrolidinyl) pyridine, or any combination thereof.

30. The method of claim 21, wherein the non-reactive solvent comprises dichloroethane, trichloroethane, tetrachloroethane, N,N-dimethyl formamide (DMF), dimethyl sulfoxide, hexamethyl phosphoramide, or any combination thereof.

31. The method of claim 21, wherein the proton solvent comprises pyridine, the halogen source is a chlorine source, and the non-reactive solvent comprises 1,1,2-trichloroethane.

32. The method of claim 21, further comprising forming a pre-gel comprising from about 2 wt. % to about 20 wt. % of the halogenated polysaccharide based on the total weight of the pre-gel.

33. A method of halogenating a polysaccharide to form a the halogenated polysaccharide having a halogen content of from about 1.0 wt. % to about 85 wt. % based on the total weight of the halogenated polysaccharide and having an average chain length of at least 6 monosaccharides, said method comprising:
adding at least one polysaccharide in at least one non-reactive solvent to at least one halogen source solution to form a precipitate in a reaction mixture;
extracting the reaction mixture with a second solvent to form an extracted organic layer; and
recovering the halogenated polysaccharide from the extracted organic layer.

34. The method of claim 33, wherein the non-reactive solvent is about 0° C. when added to the halogen source solution, the reaction mixture is first heated to about 100° C., and then heated again to about 115° C., and the extraction is performed at ambient temperature.

35. The method of claim 34, wherein the heating at about 100° C. is for from about 1 hour to about 3 hours, and the heating at about 115° C. is for from about 1 hour to about 3 hours.

36. The method of claim 33, wherein the non-reactive solvent comprises dichloroethane, trichloroethane, tetrachloroethane, N,N-dimethyl formamide (DMF), dimethyl sulfoxide, hexamethyl phosphoramide, or any combination thereof.

37. The method of claim 33, wherein the extraction is performed at least once using ethylacetate.

38. The method of claim 33, wherein the halogen source solution comprises thionyl chloride, phosgene, phosphorus trichloride, phosphorus oxychloride, or phosphorus pentachloride.

39. The method of claim 33, wherein the polysaccharide is halogenated with a substitution of halogen groups for hydroxyl groups of from about 0.5 molar equivalents to about 8.0 molar equivalents.

40. The method of claim 33, wherein the polysaccharide is halogenated with a substitution of halogen groups for hydroxyl groups of greater than about 3.0 molar equivalents.

41. The method of claim 33, further comprising forming a pre-gel comprising from about 2 wt. % to about 20 wt. % of the halogenated polysaccharide based on the total weight of the pre-gel.

42. An article of manufacture comprising a halogenated polysaccharide and polyvinylchloride, wherein the halogenated polysaccharide having a halogen content of from about 1.0 wt. % to about 85 wt. % based on the total weight of the halogenated polysaccharide and having an average chain length of at least 6 monosaccharides.

43. The article of manufacture of claim 42, further comprising at least one additive.

44. The article of manufacture of claim 43, wherein the at least one additive comprises a stabilizer, a plasticizer, a lubricant, a pigment, or any combination thereof.

45. The article of manufacture of claim 42, wherein the article of manufacture is a fiber, a board, a tile, a sheet, a mesh, a fabric, a film, a brick, a shingle, a container, a rod, a beam, a sheath, or a pipe.

46. A halogenated polysaccharide having a halogen content of from about 1.0 wt. % to about 85 wt. % based on the total weight of the halogenated polysaccharide and having an average chain length of at least 6 monosaccharides, wherein the polysaccharide is halogenated with two or more different halogens or wherein the halogenated polysaccharide is chemically modified with at least one non-halogen moiety.

* * * * *